(12) United States Patent
Riddle

(10) Patent No.: US 8,161,238 B2
(45) Date of Patent: Apr. 17, 2012

(54) SYSTEMS AND METHODS FOR AVOIDING PERFORMANCE DEGRADATION DUE TO DISK FRAGMENTATION IN A NETWORK CACHING DEVICE

(75) Inventor: Guy Riddle, Los Gatos, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 385 days.

(21) Appl. No.: 12/616,041

(22) Filed: Nov. 10, 2009

(65) Prior Publication Data

US 2011/0113195 A1    May 12, 2011

(51) Int. Cl.
*G06F 12/16* (2006.01)
(52) U.S. Cl. .................. 711/114; 711/113; 711/118
(58) Field of Classification Search .................. None
See application file for complete search history.

(56) References Cited

U.S. PATENT DOCUMENTS

| | | | |
|---|---|---|---|
| 5,860,090 A * | 1/1999 | Clark | 711/113 |
| 5,860,091 A * | 1/1999 | DeKoning et al. | 711/114 |
| 6,209,003 B1 * | 3/2001 | Mattis et al. | 1/1 |
| 2007/0250552 A1 * | 10/2007 | Lango et al. | 707/205 |
| 2007/0250601 A1 * | 10/2007 | Amlekar et al. | 709/219 |

* cited by examiner

*Primary Examiner* — Than Nguyen
(74) *Attorney, Agent, or Firm* — SNR Denton US LLP

(57) ABSTRACT

Storage space on one or more hard disks of a network caching appliance is divided into a plurality S of stripes. Each stripe is a physically contiguous section of the disk(s), and is made up of a plurality of sectors. Content, whether in the form of objects or otherwise (e.g., byte-cache stream information), is written to the stripes one at a time, and when the entire storage space has been written the stripes are recycled as a whole, one at a time. In the event of a cache hit, if the subject content is stored on an oldest D ones of the stripes, the subject content is rewritten to a currently written stripe, where $1 \leq D \leq (S-1)$.

22 Claims, 2 Drawing Sheets

SYSTEMS AND METHODS FOR AVOIDING PERFORMANCE DEGRADATION DUE TO DISK FRAGMENTATION IN A NETWORK CACHING DEVICE

FIELD OF THE INVENTION

This invention relates generally to network caching devices, such as caching proxy appliances, and more particularly to methods and systems for reducing disk fragmentation in such devices.

BACKGROUND

Network caching devices, such as proxy servers, are computer-based appliances that allow clients to make indirect connections to other services. A client connects to the proxy, then requests a connection, file, or other resource available on a different server. The proxy provides the resource either by connecting to the specified server or by serving it from a cache.

Recently, split proxy configurations have become popular. A split proxy is essentially a pair of proxies installed across two computer-based appliances. Since they are effectively two parts of the same program, the two proxies can communicate with each other very efficiently. Instead of sending entire objects or data streams between the proxies, because both appliances store the same content one proxy need only send the other a reference to where the subject content is stored. Such schemes are especially useful for compressing data over a slow or high latency communication links.

Whether being used in split proxy configurations or otherwise, however, network caching appliances can suffer performance degradation as their storage space fills up. In general, network caching appliances store content on one or more hard disks. Over time, older or less frequently requested content is replaced with newer or more frequently requested content, but this is usually done haphazardly with respect to the location of the content items on the physical disks. As a result, write performance can be severely and negatively impacted because of the need to continually reposition the write heads of the disk(s).

SUMMARY OF THE INVENTION

The present invention provides, in one embodiment, a network caching appliance in which storage space on one or more hard disks of the appliance is divided into a plurality S of stripes. Each stripe is a physically contiguous section of the disk(s), and is made up of a plurality of sectors. Content, whether in the form of objects or byte-cache stream information, etc., is written to the stripes one at a time, and when the entire storage space has been written, the oldest stripe (i.e., the stripe written longest ago as measured from a current time) is recycled as a whole. Cache hits may be served from any stripe, assuming the data is not already present in a memory cache, however, only references to the most recent version of that content are maintained. In the event of a cache hit, if the content is not present on newer, i.e., S–D, ones of the stripes, where $1 \leq D \leq (S-1)$ it is rewritten to the stripe being currently written. In one particular embodiment, D=S–1, and so the most recent version of requested content is always maintained on the stripe being currently written.

Further embodiments of the present invention provide systems and methods in which a network caching appliance has K hard disks allocated for a cache, where K is an integer, and storage space on the hard disks is divided into a plurality S of stripes, each stripe including a contiguous section of one or more of the K disks made up of a plurality of sectors. Content is written to the stripes one at a time and, in the event of a cache hit, if a newest version of the content is stored on an oldest D ones of the stripes, where $1 \leq D \leq (S-1)$, the content is rewritten to a currently written one of the stripes and indices are updated to point to the rewritten content. The indices, along with other information such as configuration information, control information, etc., is not stored in the striped storage space and my instead be stored on a separate disk or partition. The striped storage space may be used to store objects and/or byte-cache stream information, each being written to the stripes in a contiguous fashion. As each respective one of the S stripes is completely written, that respective stripe is marked as read only and new content is written to a succeeding one of the S stripes. When the storage space is completely written, the stripes are recycled as a whole, one at a time, commencing from an oldest one of the S stripes. One or more of the stripes may be made up of a number of cylinders on each of the disks and/or some may include less than an integral number of cylinders. In some cases, stripes may be reserved for use as an object cache or as a byte cache, while in other instances the object and byte cache may be comingled in a single stripe.

Other embodiments of the invention provide for storing content in a contiguous fashion on S stripes allocated on K hard disks of a network caching appliance, where K is an integer. When a request for an item included in the content is received, a copy of the item is provided. If that item is stored on an oldest D ones of the stripes, where $1 \leq D \leq (S-1)$, the item is rewritten to a currently written one of the stripes and indices are updated to point to the rewritten item. In such a scheme, the item may be an object or a portion of a byte-cache stream information.

Still a further embodiment of the invention involves a pair of network caching appliances configured as a proxy pair. Byte cache storage space on one or more hard disks of each of the network caching appliances is allocated into a plurality of stripes. The two appliances may have different numbers and sizes of disks and different numbers and sizes of stripes. At each appliance, byte cache stream information relating to applications communicating across the proxy pair are written to the respective stripes one at a time. The stripes of each appliance are recycled asynchronously from one another, as associated byte cache storage space of each of the network caching appliances is filled. The respective stripes of each appliance are each recycled as a whole.

Other systems, methods, features, and advantages of the invention are discussed in detail below.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Described herein are methods and systems for reducing disk fragmentation in network caching devices, such as caching proxy appliances. In general, disk space with such devices is divided or segmented into "stripes" and content is written to stripes one at a time. When a stripe fills up, rather than trying to recycle any portions of the stripe by erasing and rewriting it, the stripe is marked as "read only" and new content is written to a succeeding stripe. In one embodiment, cache hits to a read only stripe will cause the corresponding data to be rewritten to the stripe currently being written. Alternatively, if the cache hit is to a read only stripe that is within a predetermined number of stripes from the stripe currently being written, the data will not rewritten. When an entire disk has been filled, entire stripes are recycled one at a time beginning with the "oldest stripe" (i.e., the one written longest ago as measured from a current time), thus reducing the fragmentation of the disk and minimizing the need to move the write heads. Disk sectors may be allocated to stripes so as to optimize disk writing performance for the subject appliance.

The present scheme may result in multiple copies of popular content items being stored on a disk, however, it is believed that the improvement in write performance provides an acceptable trade off for such occurrences. Fragmentation is reduced, if not eliminated, because stripes are relatively large, contiguous segments of a disk and so all writes to the disk are contiguous in nature. Further, content replacement strategies are simplified, reducing processing overhead for the appliance.

Although presented in the context of network caching devices, the present invention is applicable to any data storage device that includes one or more hard disk drives (HDDs). HDDs are rapidly rotating disks coated with a magnetic material to store data in the form of magnetically encoded information elements. HDDs can offer significant available storage space (e.g., on the order of terabytes), but the speed at which data can be written to and/or read from such devices is limited by physical properties such as the size of the disk(s) (platens) on which the data is stored, the speed at which the disk(s) rotate, and the time required for the write/read head(s) to be maneuvered into the correct position to write/read the requested data information elements (the so-called seek time).

Figure 1:
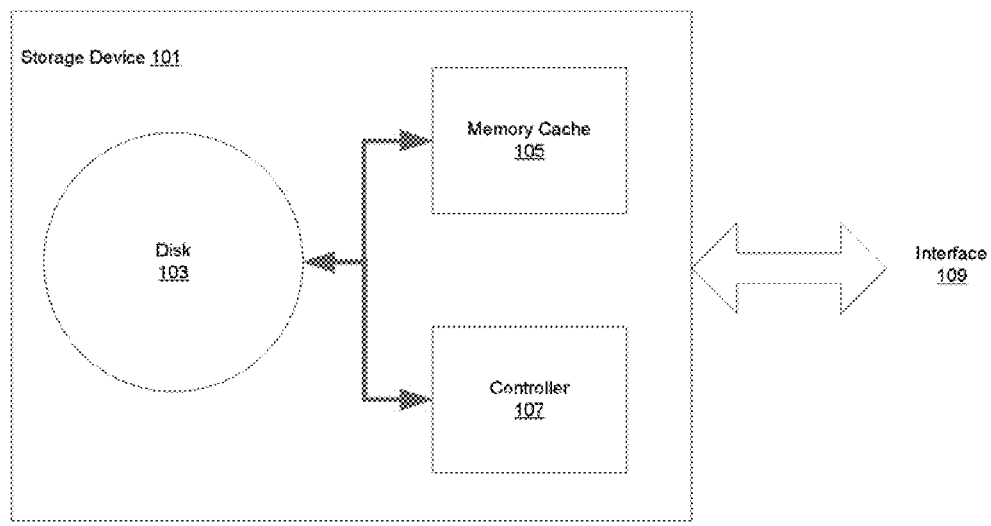
FIG. 1 illustrates an example of a storage device suitable for use in accordance with embodiments of the present invention.

FIG. 1 shows an example of a storage device 101 in which embodiments of the present invention may be instantiated. Storage device 101 includes one or more hard disks (i.e., platens) 103 and a memory cache 105. The read/write heads and other items associated with disks 103 are not shown in detail so as not to unnecessarily complicate the discussion presented herein, but it should be recognized that such items are intended for inclusion in storage device 101 so as to facilitate the proper operation thereof. The disks 103 and memory cache 105 are under the control of a controller 107, which may include firmware that instantiates the stripe-based write protocol discussed herein.

Storage device 101 is accessible (e.g., to applications running on a host machine) via a host interface 109, which may, in general, conform to specifications for disk-based storage devices common in the industry (e.g., an advanced host controller interface that uses a serial ATA bus, a small computer system interface (SCSI) or variants thereof, etc.). Alternatively, where storage device 101 is a network caching appliance, interface 109 may be a network interface used by client computers or companion devices of a split proxy pair. In still further embodiments, the storage system that employs the disk media may be maintained separately from the application which accesses that storage system (e.g., instantiations such as a storage area network (SAN) or Internet-SCSI (iSCSI)-based storage networks). Except where particular protocols are called out, the systems and methods disclosed herein do not depend on the particular protocol being used and can be configured to operate correctly with all of them.

Figure 2:
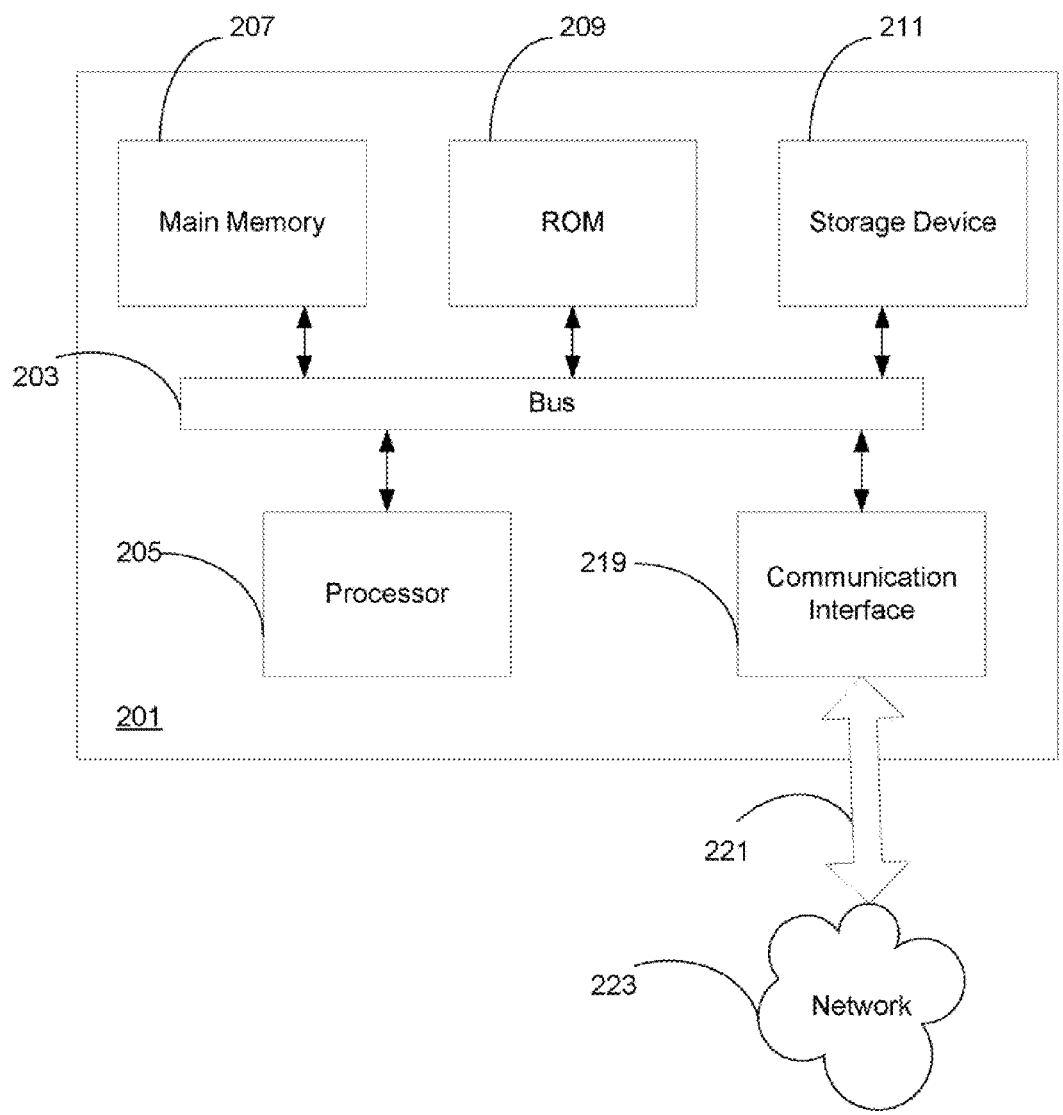
FIG. 2 illustrates a computer system suitable for use as a network caching appliance configured in accordance with embodiments of the present invention.

FIG. 2 illustrates an alternative view of a computer system that can be configured as a network caching device consistent with an embodiment of the present invention. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a HDD, is provided and coupled to bus 203 for storing information and instructions. Storage device 211, or a portion thereof, may also act as the disk cache for the network caching appliance. According to one embodiment of the invention, processor 205 executes sequences of instructions (e.g., contained in main memory 207 and/or storage device 211) to perform the stripe-based writes discussed herein. In alternative embodiments, hard-wired circuitry may be used in place of or in combination with software instructions. Thus, embodiments of the invention are not limited to any specific combination of hardware circuitry and software.

Further, the instructions to support the processes of the present invention may reside on a computer-readable medium. The term "computer-readable medium" as used herein refers to any tangible medium that participates in providing instructions to processor 205 for execution. Common forms of computer-readable media include, for example, floppy disks, HDDs or other magnetic media, CD-ROMs or other optical media, RAMs, PROMs, and EPROMs, etc.

Computer system 201 also includes a communication interface 219 coupled to bus 203. Communication interface 219 provides a two-way data communication between computer system 201 and a network 223 via a network link 221. Communication interface 219 may be, for example, a network interface card or a modem.

Information stored on a hard disk is recorded in tracks—concentric circle on the surface of a disk platen. Tracks are typically numbered, starting from zero, from outermost to innermost and modern hard disks typically have tens of thousands of tracks on each platen. For HDDs with multiple platens, the set of common tracks across the platens is referred to as a cylinder. Each track can store thousands of bytes of data. In order to conserve storage space, hard disk tracks are divided into smaller units called sectors. Each sector can store 512 bytes of data, along with some additional error detection and correction information.

Figure 3:
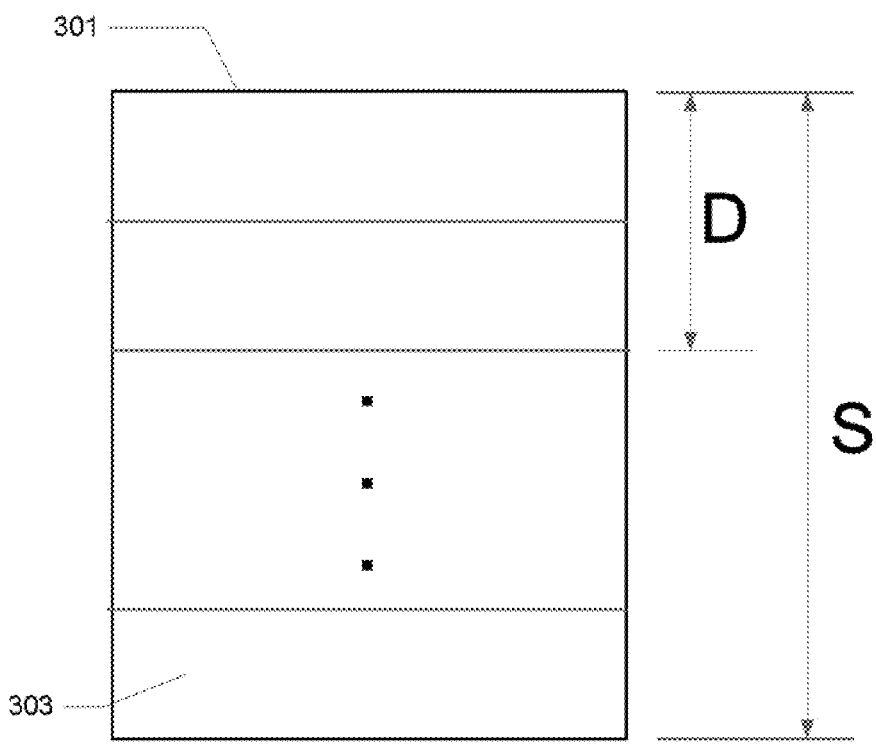
FIG. 3 illustrates an example of a hard disk that has been segmented in stripes in accordance with an embodiment of the present invention.

Referring now to FIG. 3, in accordance with and embodiment of the present invention a HDD 301 (e.g., which may comprise the disk cache of a network caching appliance) is divided into "S" stripes 303. A stripe is a relatively large, contiguous section of disk 301, and generally should not be less than one cylinder in size (across all platens of the appliance). For example, a stripe may be several tracks in length and, where a multiple platen HDD is used, may comprise several cylinders. In some instances, S may be equal to 3 or 4, but for sufficiently large disks S may be greater than 4. Even where a relatively small HDD is used, S may be greater than 4. Note that while FIG. 3 illustrates a single disk, for a system with K number of disks allocated as a cache, K being an integer, one would spread the stripes across the K disks, with the first track of the stripe on cylinder 0 of disk 1, the second track of the stripe on cylinder 0 of disk 2, and so on to the $K^{th}$ track of the stripe on cylinder 0 of disk K, then the $K^{th}$+1 track of the stripe would be a second track on cylinder 0 of disk I, the $K^{th}$+2 track of the stripe would be a second track on cylinder 0 of disk 2, and so on, until all of the tracks of cylinder 0 were used and the stripe moved on to tracks of cylinder 1. The goal is to spread the storage space over the available disks in a way that allows for minimal head movement. Thus, in one embodiment of the invention one or more of the stripes may comprise a number of cylinders on each of the disks. Of course, in other embodiments, some or all of the stripes could comprise cylinders on less than all of the disks, and/or stripes could contain tracks comprising fewer than an integral numbers of cylinders.

Stripes 303 are written one at a time. For example, when disk 301 is used as an object cache and/or a byte cache, the objects and/or the information that make up the streams being stored are written to a stripe in a contiguous fashion. When a stripe fills up, rather than trying to recycle any portions of the stripe by erasing and rewriting it, the stripe is marked as "read only" and new content is written to a succeeding stripe.

Cache hits may result in the subject information (e.g., a object or an identified portion of a stream) being rewritten to HDD 301 or not, depending on where the most recent copy of the subject information exists. For very popular objects or information, it is likely that the object or information will exist in the memory cache of the appliance and the object or other content will be served from that memory cache. Less popular content, which is not present in the memory cache, is served out of the disk cache. In either instance, if the newest version of the subject content exists only in one of the oldest D stripes of disk 301, where $1 \leq D \leq (S-1)$, then, in addition to the content being served from that stripe, it is rewritten to the stripe currently being written and the indices or pointers associated with that content are updated to point to the new version thereof on the currently written stripe. Stated differently, while cache hits may be served from any stripe, assuming the data is not already present in a memory cache, only references to the most recent version of that content are maintained. If the content is not present on newer, i.e., S–D, ones of the stripes, it is rewritten to the stripe being currently written.

The behavior of the appliance can be varied by adjusting the D parameter. In one embodiment, D=S−1, and so any hits to stripes other than the currently written stripe result in the subject object or other information being rewritten to the currently written stripe. While this may involve additional writes over other schemes, one still saves bandwidth over having to fetch an original copy of the content from an origin server. In other instances, other values of D are used. This may result in fewer writes (and may therefore be somewhat more conservative of disk space in general), but on subsequent hits to the same content there will be time penalties incurred due to the need to move the disk heads away from the currently written stripe.

When the entire disk 301 has been filled, the stripes are recycled in whole, one at a time. That is, entire stripes are re-written a stripe at a time, beginning with the oldest stripe (i.e., that written longest ago from the standpoint of a current time). This reduces fragmentation of the disk from what it might be if some other replacement scheme (such as a least recently used sector scheme) were used, and also minimizes the need to move the disk heads.

Disk sectors may be allocated to stripes so as to optimize disk writing performance for the subject appliance. For example, some portion of a disk may be reserved for very large objects that are multiple tracks, or cylinders, in size and which are the subject of frequent cache hits. Audio/video programs, for example, may be treated in such fashion and stored outside of the "striped" environment. Further, persistent data such as indices, control information, configuration information, application software, and the like should be stored outside of the striped environment, either on a separate disk, if available, or elsewhere (e.g., a separate partition on one or more of the disks). This way, the persistent data will not be overwritten when the stripes are recycled.

Stripes may be numbered using a relatively large, e.g., 64-bit, number. Thus, the location of any object or other information stored on the disk may be identified by a pointer, which is a combination (e.g., a concatenation) of a stripe number and an offset, where the offset indicates the beginning of the information or object of interest as referenced from the beginning of the stripe. Thus, the pointer indicates the location of the object, or other information, currently, and over time. The pointer is always monotonically increasing, so that a larger number is always "newer" than a smaller number (i.e., indicates a more recently written object). This means that although stripes are eventually rewritten, stripe numbers are not reused.

As a shortcut for a pointer, one could use a concatenation of a portion or the stripe number, say the least significant "n" bits thereof, where n may be equal to 8 for example, and the offset. Since the current location of the write pointer is always known in full, then if the high order bits of the write pointer (call them Sp) are concatenated with the low order bits of a shortcut pointer and the resulting value is greater than the current location of the write pointer, then the actual pointer value must be (Sp−1) concatenated with the low order bits of the shortcut (assuming there are no stripe number references more than $2^n$ bits away from the current write pointer location). Using such shortcuts can save on the amount of space required to store indices and the like.

As indicated, the present scheme is particularly useful in the context of a network caching appliance. In such a context, content (e.g., objects or the like, or data streams in the case of a split proxy) may be stored in a contiguous fashion on S stripes allocated on K hard disks of the appliance, and, in response to a request for an item included in that content, a copy of the item may be provided from the disk cache. In accordance with the above-described process, if the item is stored on an oldest D ones of the stripes, where $I \leq D \leq (S-1)$, the item is rewritten to a currently written one of said stripes and indices pointing to the rewritten item are updated. Otherwise, if the item is provided from a newer one of the stripes, it need not be rewritten to the currently written stripe.

In the byte-cache context (e.g., where pairs of network caching appliances are configured as a split proxy and must synchronize content sent and received between them), it is conceivable, perhaps even likely, that two network caching appliances will have different numbers of stripes and/or different sizes of stripes. Therefore, it is likely that the appliances will exhibit different recycling behaviors (i.e., the appliances will reuse stripes out of synch from one another). Accordingly, a mechanism is needed to accommodate the byte-cache streams being stored by the two appliances.

In one embodiment of the invention, each appliance manages its stripes asynchronously from the other. That is, each appliance manages its stripes in the manner described above, recycling as necessary according to the volume of data being stored on the disk cache, without regard for how the stripes are being managed by the counterpart appliance. In this example, streams are written as they are transmitted at the "end" (i.e., the presently unused portion) of a stripe currently being written at each appliance. When one of the appliances recycles its oldest (or least recently used) stripe, that appliance truncates data from the "oldest" end of each stream. Both appliances truncate their respective streams (regardless of direction) and so the appliance having the minimum stripe recycle time of the two defines the limit for valid stream data stored by both appliances. The data retention period for a stream is thus defined in a temporal fashion (by the minimum stripe recycle time of an appliance or the proxy pair). By way of example, consider two nodes, A and B, of a proxy pair. If node A recycles a stripe every N hours and node B recycles a stripe every M hours, then streams between A and B should retain byte cache information going back at least min(M, N) hours. If M is 19 and N is 13, then streams between A and B should retain byte cache data going back 13 hours.

In a scenario where a single network caching appliance is used at a data center end to connect with a number of other network caching appliances, each at a branch office end, to facilitate byte caching for each branch office with the'data center, the above-described management scheme does have some implications. For example, less busy ones of the branch offices will be provided less byte cache space on the data canter appliance than is provided busier ones of the branch offices. This is because the byte cache of the data center appliance is allocated into stripes which are recycled as a whole, rather than being recycled according to whether or not a particular byte cache allocated to a data center appliance-branch office appliance pair has used up its allocated disk space. Indeed, such considerations are irrelevant in the present scheme.

In some implementations, object cache and byte-cache data may be comingled within stripes. This may afford opportunities to forego duplication of data from recent objects in the byte cache streams. Alternatively, within a single appliance, certain numbers of stripes may be reserved for object cache data and others for byte cache data. This may be particularly advantageous where there are a relatively larger number of smaller stripes than cases where there are a relatively fewer number of larger stripes.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method, comprising in a network caching appliance having K hard disks allocated for a cache, where K is an integer, dividing storage space on said hard disks into a plurality S of stripes, each stripe including a contiguous section of one or more of the K disks made up of a plurality of sectors; writing content to said stripes one at a time; and, in the event of a cache hit to content stored by said network caching appliance, if a newest version of said content is stored on an oldest D ones of the stripes, where $1 \leq D \leq (S-1)$, rewriting the content to a currently written one of said stripes and updating indices to point to said rewritten content, otherwise, not rewriting the content.

2. The method of claim 1, wherein objects and byte-cache stream information are written to each stripe in a contiguous fashion.

3. The method of claim 2, wherein as each respective one of the S stripes is completely written, that respective stripe is marked as read only and new content is written to a succeeding one of the S stripes.

4. The method of claim 3, wherein the respective stripes are recycled as a whole, one at a time commencing from an oldest one of the S stripes, when the storage space is completely written.

5. The method of claim 1, wherein $D=S-1$.

6. The method of claim 1, wherein $K>1$ and a first one of the S stripes comprises a number of cylinders on each of the K disks.

7. The method of claim 1, wherein at least some of the S stripes are reserved for use as an object cache.

8. The method of claim 1, wherein at least some of the S stripes are reserved for use as a byte cache.

9. A network caching appliance, comprising K hard disks allocated as a disk cache, where K is an integer, and a controller, the controller being configured to divide storage space on said hard disks into a plurality S of stripes, each stripe including a contiguous section of one or more of the K disks made up of a plurality of sectors, writing content to said stripes one at a time, and, in the event of a cache hit to content stored by said network caching appliance, if a newest version of said content is stored on an oldest D ones of the stripes, where $1 \leq D \leq (S-1)$, rewrite the content to a currently written one of said stripes and updating indices to point to said rewritten content, otherwise, not rewrite the content.

10. The network caching appliance of claim 9, wherein the controller is further configured to write objects and byte-cache stream information to each stripe in a contiguous fashion.

11. The network caching appliance of claim 10, wherein the controller is further configured to mark each respective one of the S stripes as read only as that respective stripe is completely written, and to write new content to a succeeding one of the S stripes.

12. The network caching appliance of claim 11, wherein the controller is further configured to recycle the respective stripes as a whole, one at a time, commencing from an oldest one of the S stripes, when the storage space is completely written.

13. The network caching appliance of claim 9, wherein $D=S-1$.

14. The network caching appliance of claim 9, wherein $K>1$ and a first one of the S stripes comprises a number of cylinders on each of the K disks.

15. The network caching appliance of claim 9, wherein the controller is further configured to reserve at least some of the S stripes for use as an object cache.

16. The network caching appliance of claim 9, wherein the controller is further configured to reserve at least some of the S stripes for use as a byte cache.

17. A method, comprising storing content in a contiguous fashion on S stripes allocated on K hard disks of a network caching appliance, where K is an integer; receiving a request for an item included in the content; responding to the request by providing a copy of the item; and, if the item is stored on an oldest D ones of the stripes, where $1 \leq D \leq (S-1)$, rewriting the item to a currently written one of said stripes and updating indices to point to said rewritten item, otherwise, not rewriting the item.

18. The method of claim 17, wherein the item comprises an object or byte-cache stream information.

19. The method of claim 17, wherein D=S−1.

20. The method of claim 17, wherein at least some of the S stripes are reserved as an object cache.

21. The method of claim 17, wherein at least some of the S stripes are reserved for byte-cache stream information.

22. A method, comprising:
- at a first one of a pair of network caching appliances configured as a proxy pair, wherein byte cache storage space on one or more hard disks of said first network caching appliance is allocated into a plurality S of stripes, each stripe including a contiguous section of one or more of the disks of the first network caching appliance made up of a plurality of sectors, writing byte cache stream information relating to applications communicating across said proxy pair to said S stripes one at a time;
- at a second one of the pair of network caching appliances, wherein byte cache storage space on one or more hard disks of said second network caching appliance is allocated into a plurality P of stripes, each stripe including a contiguous section of one or more of the disks of the second network caching appliance made up of a plurality of sectors, writing byte cache stream information relating to the applications to said P stripes one at a time; and
- recycling respective ones of the S and P stripes of the first and second network caching appliance asynchronously from one another, as associated byte cache storage space of each of the first and second network caching appliance is filled, wherein said respective stripes are each recycled as a whole.

* * * * *